(12) United States Patent
Wu

(10) Patent No.: US 8,908,107 B2
(45) Date of Patent: Dec. 9, 2014

(54) REMOTE CONTROL SYSTEM AND REMOTE CONTROL METHOD THEREOF

(71) Applicant: Cheng-Shen Wu, Taipei (TW)

(72) Inventor: Cheng-Shen Wu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 13/902,864

(22) Filed: May 27, 2013

(65) Prior Publication Data

US 2013/0321712 A1 Dec. 5, 2013

(30) Foreign Application Priority Data

May 30, 2012 (CN) .......................... 2012 1 0175106

(51) Int. Cl.
*H04N 5/44* (2011.01)
*H04N 21/478* (2011.01)
*H04N 21/422* (2011.01)
*G06F 3/0488* (2013.01)

(52) U.S. Cl.
CPC ...... *H04N 5/4403* (2013.01); *H04N 2005/4428* (2013.01); *H04N 21/4781* (2013.01); *H04N 21/42224* (2013.01); *G06F 3/0488* (2013.01)
USPC ........... 348/734; 348/726; 348/725; 348/723; 348/706; 348/610; 348/636; 348/680; 348/693; 348/699; 348/556; 348/569; 348/452; 348/407.1; 348/352; 348/211.2; 348/208.1; 348/158; 348/155; 348/154; 348/141; 348/14.1; 348/14.02; 348/14.05; 348/14.07; 345/156; 345/157; 345/158; 345/159; 345/160; 345/161; 345/162; 345/163; 345/172; 345/173

(58) Field of Classification Search
USPC ......... 348/734, 725, 699, 556, 452, 158, 155, 348/143, 14.1, 14.05, 14.02, 726, 723, 706, 348/636, 680, 693, 610, 407.1, 352, 211.2, 348/208.1, 154, 141, 14.07; 345/156–163, 345/172, 173
See application file for complete search history.

(56) References Cited

U.S. PATENT DOCUMENTS

| | | | |
|---|---|---|---|
| 6,633,231 B1 * | 10/2003 | Okamoto et al. | 340/539.11 |
| 6,765,557 B1 | 7/2004 | Segal et al. | |
| 6,809,759 B1 * | 10/2004 | Chiang | 348/211.2 |
| 7,460,655 B2 * | 12/2008 | Fujisawa et al. | 379/106.01 |
| 7,538,686 B2 * | 5/2009 | Yeh et al. | 340/12.54 |
| 8,159,459 B2 * | 4/2012 | Chen | 345/158 |
| 2002/0013161 A1 * | 1/2002 | Schaeffer et al. | 455/557 |
| 2002/0113861 A1 * | 8/2002 | Lim et al. | 348/14.02 |
| 2003/0023347 A1 * | 1/2003 | Konno et al. | 700/245 |

(Continued)

FOREIGN PATENT DOCUMENTS

CN 102111582 6/2011

*Primary Examiner* — Jefferey Harold
*Assistant Examiner* — Mustafizur Rahman
(74) *Attorney, Agent, or Firm* — Jianq Chyun IP Office

(57) ABSTRACT

A remote control system includes a remote control device and an electronic device. The remote control device includes an input element, a wireless transmitter to transmit an absolute coordinate signal and a motion signal and a control unit electrically connected to the input element and the wireless transmitter. The electronic device includes a wireless receiver and a display screen. The wireless receiver receives the absolute coordinate signal and the motion signal, and displays the absolute coordinate signal at the display screen via a cursor. When the electronic device does not receive the motion signal, the absolute coordinate signal is not operated on an application program of the electronic device. When the electronic device receives the motion signal, the absolute coordinate signal is operated on the application program.

10 Claims, 2 Drawing Sheets

(56) References Cited

U.S. PATENT DOCUMENTS

| | | | |
|---|---|---|---|
| 2006/0139327 A1* | 6/2006 | Dawson et al. | 345/158 |
| 2007/0052177 A1* | 3/2007 | Ikeda et al. | 273/317 |
| 2007/0165787 A1* | 7/2007 | Kim et al. | 379/1.01 |
| 2007/0273655 A1* | 11/2007 | Yeh et al. | 345/169 |
| 2007/0296707 A1* | 12/2007 | Kang et al. | 345/172 |
| 2009/0046063 A1* | 2/2009 | Chen | 345/158 |
| 2009/0059084 A1* | 3/2009 | Okada et al. | 348/699 |
| 2009/0113103 A1* | 4/2009 | Chiang | 710/301 |
| 2010/0138797 A1* | 6/2010 | Thorn | 715/863 |
| 2010/0253622 A1* | 10/2010 | Makita | 345/158 |
| 2011/0199299 A1* | 8/2011 | Miyashita | 345/157 |
| 2012/0162514 A1* | 6/2012 | Ryu et al. | 348/556 |
| 2012/0162538 A1* | 6/2012 | Dixon et al. | 348/734 |
| 2012/0182231 A1* | 7/2012 | Lin | 345/173 |
| 2012/0206350 A1* | 8/2012 | Figaro et al. | 345/158 |

* cited by examiner

REMOTE CONTROL SYSTEM AND REMOTE CONTROL METHOD THEREOF

CROSS-REFERENCE TO RELATED APPLICATION

This application claims the priority benefit of China application serial No. 201210175106.6, filed on May 30, 2012. The entirety of the above-mentioned patent application is hereby incorporated by reference herein and made a part of specification.

BACKGROUND OF THE INVENTION

1. Field of the Invention

The invention relates to a remote control system and a remote control method thereof.

2. Description of the Related Art

Nowadays, most electronic products, such as a television (TV), an air conditioner or sound equipment, are controlled wirelessly. The user does not need to press a button of the electronic product to control it, and he or she can use a remote controller to control the electronic product.

Taking the television as an example, when the user presses a power button of a TV controller, the TV is power on, and the user can press other buttons to control channels, volume, contrast and settings of the TV. As technology develops, the TV can also be used as a play station.

However, application programs of many popular games cannot be run at the TV. For example, as a tablet computer and a smart mobile phone develop rapidly, lots of application programs supporting the tablet computer and the smart mobile phone are made. The application programs may be operated via a touch control screen, but a conventional TV does not include a touch control screen. Thus, the application programs cannot run at the TV, and the user cannot use the large screen of the TV to play games.

BRIEF SUMMARY OF THE INVENTION

A remote control system includes a remote control device and an electronic device. The remote control device includes an input element, a control unit and a wireless transmitter. The control unit is electrically connected to the input element and the wireless transmitter. The input element may be a touch control pad. The wireless transmitter transmits an absolute coordinate signal and a motion signal. The electronic device includes a wireless receiver and a display screen. The wireless receiver receives the absolute coordinate signal and the motion signal, and displays the absolute coordinate signal at the display screen via a cursor. When the electronic device does not receive the motion signal, the absolute coordinate signal is not operated on an application program of the electronic device, and when the electronic device receives the motion signal, the absolute coordinate signal is operated on the application program.

A remote control method applied to a remote control device and an electronic device includes following steps: receiving a motion at the remote control device and generating an absolute coordinate signal; transmitting the absolute coordinate signal to the electronic device; displaying the absolute coordinate signal at the electronic device via a cursor, wherein the absolute coordinate signal is not operated on an application program of the electronic device; and receiving a motion signal at the remote control device, wherein the remote control device transmits the motion signal to the electronic device to make the absolute coordinate signal is operated on the application program.

The remote control system and the remote control method thereof generate the absolute coordinate signal via the motion at the input element. The absolute coordinate signal is displayed at the display screen via a cursor. When a command of the application program is executed, a motion signal is sent out, and the controller executes the application program according to the absolute coordinate signal. The remote control system and the remote control method thereof can also run the application program supporting a touch control function on the electronic device without a touch control screen.

These and other features, aspects and advantages of the present invention will become better understood with regard to the following description, appended claims, and accompanying drawings.

DETAILED DESCRIPTION OF THE EMBODIMENTS

A remote control system and a remote control method thereof are illustrated with relating figures, and the same symbols denote the same components.

Figure 1:
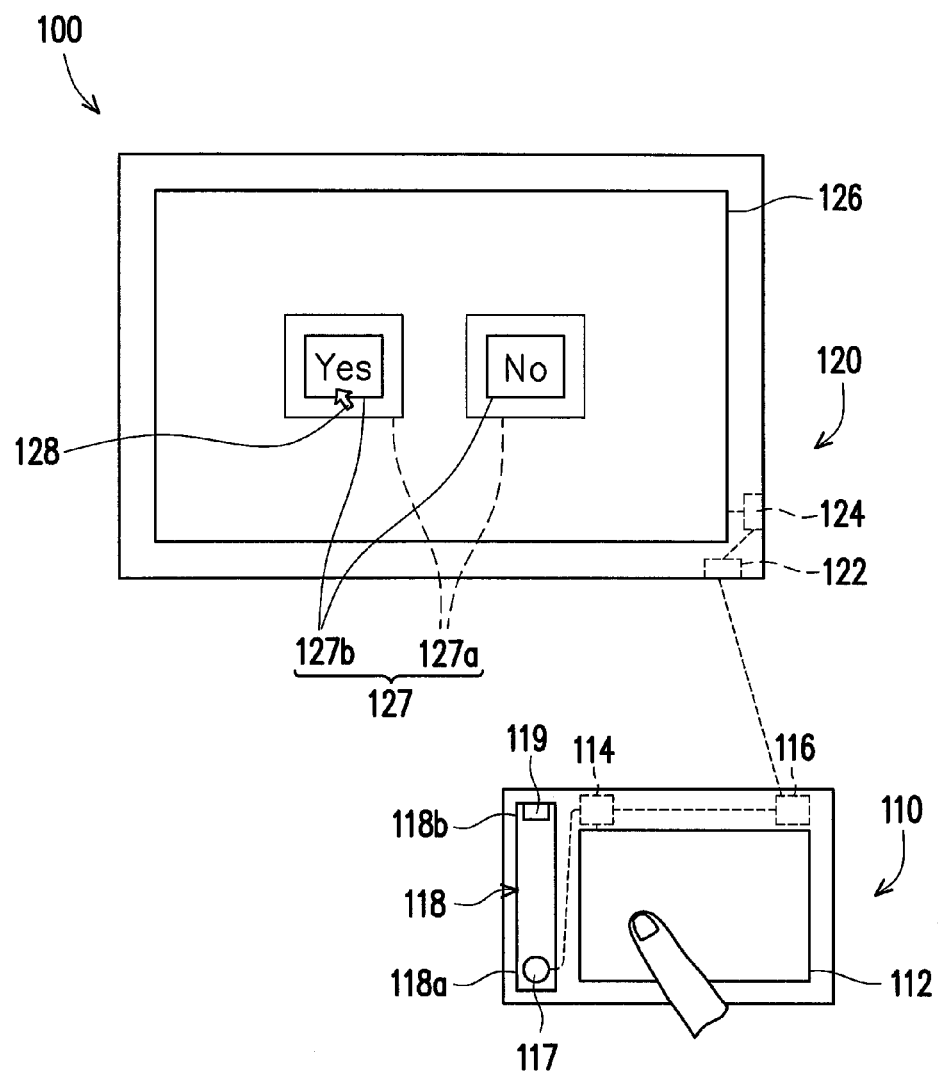
FIG. 1 is a schematic diagram showing a remote control system in an embodiment.

FIG. 1 is a schematic diagram showing a remote control system in an embodiment. Please refer to FIG. 1, the remote control system 100 includes a remote control device 110 and an electronic device 120. The remote control device 110 may be a mobile phone or a computer, and the electronic device 120 may be a TV, which is not limited herein.

The remote control device 110 includes an input element 112, a control unit 114 and a wireless transmitter 116. The input element 112 may be a touchpad. The input element 112, the wireless transmitter 116 are electrically connected to the control unit 114, respectively. The wireless transmitter 116 transmits the absolute coordinate signal and the motion signal.

The electronic device 120 includes a wireless receiver 122 and a display screen 126. The wireless receiver 122 corresponds to the wireless transmitter 116, receives the absolute coordinate signal and the motion signal and displays the absolute coordinate signal at the display screen 126 via a cursor 128. When the electronic device 120 does not receive the motion signal, the absolute coordinate signal is not operated on the application program of the electronic device 120. When the electronic device 120 receives the motion signal, the absolute coordinate signal is operated on the application program.

When the user touches the input element 112, the control unit 114 senses the touch at the input element 112 to generate the absolute coordinate signal, and the wireless transmitter 116 transmits the absolute coordinate signal to the electronic device 120.

The remote control device 110 further includes a button 117, a groove 118 and a fixing part 119. The button 117 is electrically connected to the control unit 114. When the button 117 is pressed, the control unit 114 sends out the motion signal. The wireless transmitter 116 transmits the motion signal to the electronic device 120.

The electronic device 120 further includes a controller 124 electrically connected the wireless receiver 122 and the display screen 126.

In the embodiment, the controller 124 includes a drive program to execute the application program with the touch control function and output an image 127 of the application program to the display screen 126. A plurality of areas 127a in the image 127 correspond to a plurality of commands 127b, respectively. Moreover, the controller 124 displays the absolute coordinate signal at the display screen 126 via the cursor 128.

The remote control system 100 operates the application program at the display screen 126 by operating the remote control device 110, and thus the application program with touch control function can run at the display screen 126 without the touch control screen. Furthermore, when the user operates the input element 112, the touch position at the input element 112 is different from that of the cursor 128 at the display screen 126. When the user operates the input element 112, he or she touches a position at the input element 112, but he or she may touch another area 127a at the display screen 126 and execute other commands 127b. In the embodiment, the button 117 is taken as a switch to determine whether the touch at the input element 112 works on the application program.

When the user does not press the button 117 and only operates the input element 112, the control unit 114 of the remote control device 110 converts the signal of the sensed touch position to the absolute coordinate signal, and the wireless transmitter 116 transmits the absolute coordinate signal to the wireless receiver 122 of the electronic device 120. The wireless receiver 122 transmits the absolute coordinate signal to the controller 124, and the controller 124 converts the absolute coordinate signal to the displayed cursor 128 at the display screen 126.

Even though the cursor 128 in the image 127 moves with the touch position at the input element 112, it is not operated on the application program executed by the controller 124 and displayed at the display screen 126. The cursor 128 can be regarded as floating above the image 127 and does not contact with the image 127. That means, when the user moves the cursor 128 above one command 127b in the image 127 and clicks on the input element 112, the command 127b cannot be executed.

When the user presses the button 117 to generate the motion signal, the motion at the input element 112 is operated on the application program via the controller 124. After the controller 124 receives the motion signal, the absolute coordinate signal (the absolute coordinate signal is generated by a motion at the input element 112) received by the electronic device 120 is operated on the application program and is displayed at the display screen 126. The command 127b corresponding to the area 127a in which the cursor 128 located is executed according to the motion at the input element 112. Thus, when the user uses the remote control system, the cursor 128 can be moved to the predetermined area 127a in the image 127 first, and the button 117 is pressed to execute the command 127b at the area 127a.

In the embodiment, the aspect ratio of the input element 112 is the same as that of the display screen 126. Since the touch position at the input element 112 is outputted according to its absolute coordinate, when the user touches the upper left corner of the input element 112, the cursor 128 is displayed at the upper left corner of the display screen 126. The aspect ratio of the input element 112 and the display screen 126 may also be different, and the absolute coordinate signal sent by the remote control device 110 is converted to a corresponding position at the display screen 126 by the controller 124.

Furthermore, the user may use both hands to operate the input element 112 to execute the application program and he or she cannot press the button 117 at the same time, or the user needs to execute the application program directly by operating the input element 112 and display it at the display screen 126 in a period, but he or she does not want to keep pressing the button 117. Consequently, in the embodiment, the groove 118 has a first end 118a and a second end 118b, and the button 117 is movable disposed in the groove 118. The fixing part 119 is disposed at the second end 118b, and the button 117 is disposed at the first end 118a of the groove 118. The button 117 is pressed to generate one motion signal. If the user wants to generate the motion signal continuously, the button 117 is pressed at the first end 118a of the groove 118 and slides to the second end 118b of the groove 118 to be fixed by the fixing part 119, and thus the user does not need to keep pressing the button 117 all the time. Then, the user can use the display screen 126 as a touch control screen by operating the input element 112.

The fixing part 119 may also be a push-push type mechanism to generate the motion signal continuously and execute the application program directly by operating the input element 112. When the button 117 is pressed down, it is fixed by the fixing part 119. When the user does not need to directly execute the application program by operating the input element 112, he or she can press the button 117 again to restore.

Figure 2:
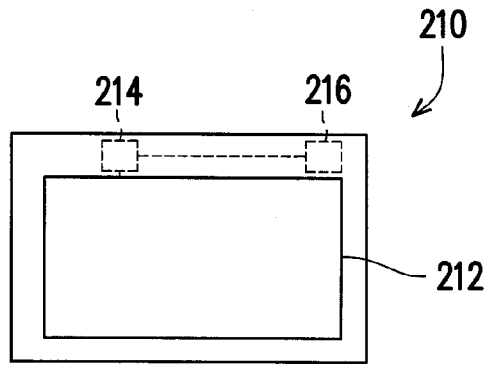
FIG. 2 is a schematic diagram showing a remote control device of a remote control system in another embodiment.

FIG. 2 is a schematic diagram showing a remote control device of a remote control system in another embodiment. Please refer to FIG. 2, the remote control device 210 includes an input element 212, a control unit 214 and a wireless transmitter 216. The input element 212 and the wireless transmitter 216 are electrically connected to the control unit 214, respectively. In the embodiment, the absolute coordinate signal and the motion signal are generated by operating the input element 212 to reduce components of the remote control device 210 and save cost.

For example, the user touches the input element 212 to generate the absolute coordinate signal of the touch position. The input element 212 receives the predetermined motion, such as a double-clicking motion at the input element 212, to generate the motion signal. The predetermined motion is set by the developers as long as it can generate the motion signal by operating the input element 212 to execute the application program directly. The motion signal can be generated by pressing the button or inputting the predetermined motion at the input element, which is not limited herein.

The motion signal may also be generated in other ways. Taking a resistive touchpad as an example of the input element, the resistive touchpad includes a pressure sensing function and the control unit sets a threshold. When the pressure at the touchpad is smaller than the threshold, the control unit generates the absolute coordinate signal. When the pressure at the touchpad is larger than the threshold, the control unit generates the motion signal. The input element may also be a capacitive touchpad, and the control unit senses a touching area at the touchpad to determine the motion of the user. A proximity sensing technology may also be used to determine whether to generate the absolute coordinate signal or the motion signal.

Figure 3:
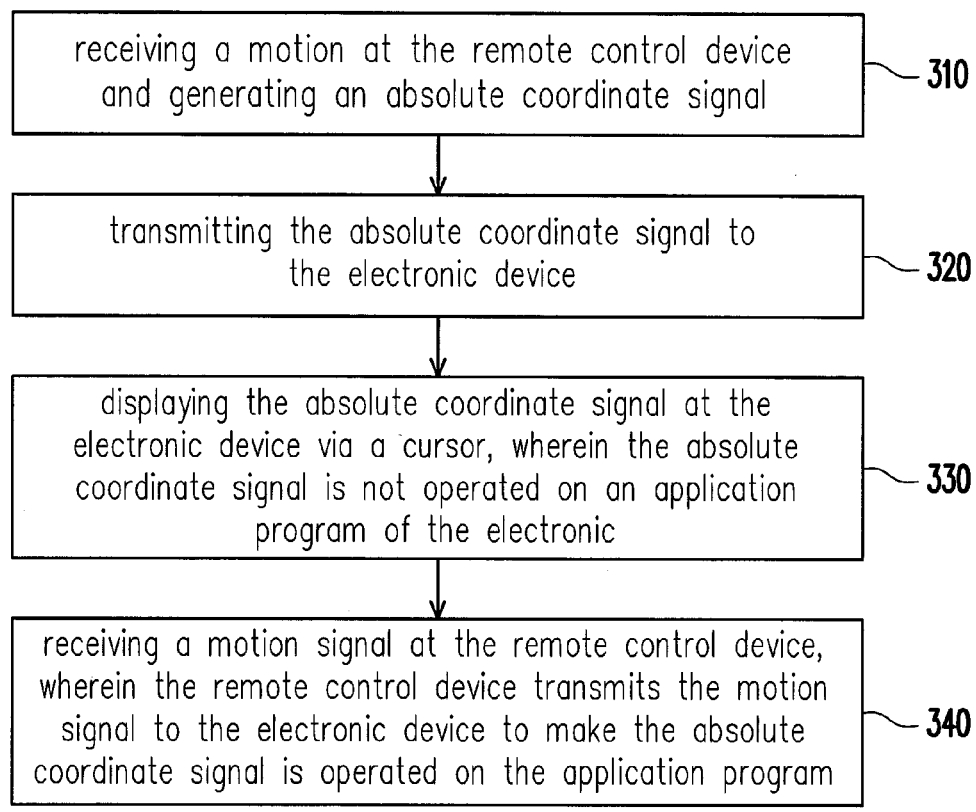
FIG. 3 is a flow chart showing a remote control method of a remote control system in an embodiment.

FIG. 3 is a flow chart showing a remote control method of a remote control system in an embodiment. Please refer to FIG. 3, the remote control method 300 of the remote control system enables the electronic device without a touch control screen (such as a TV) to execute the application program with touch control function. Thus, the application program supporting touch control can be applied to the TV without modification. The electronic device can be any device as long as it can cooperate with the remote control device and directly execute the application program supporting touch control.

The remote control method 300 of the remote control system is applied to a remote control device and an electronic device. The remote control method includes following steps: receiving a motion at the remote control device and generating an absolute coordinate signal (step 310); transmitting the absolute coordinate signal to the electronic device (step 320); displaying the absolute coordinate signal at the electronic device via a cursor, wherein the absolute coordinate signal is not operated on an application program of the electronic device (step 330); and receiving a motion signal at the remote control device, wherein the remote control device transmits the motion signal to the electronic device to make the absolute coordinate signal be operated on the application program (step 340).

The remote control device includes an input element, a control unit and a wireless transmitter. The control unit is electrically connected to the input element and the wireless transmitter. The user presses the input element to make the control unit sense a touch position at the input element and converts it to the absolute coordinate signal.

The electronic device includes a wireless receiver corresponding to the wireless transmitter, a controller and a display screen. The controller is electrically connected between the wireless receiver and the display screen, and the controller outputs an image of the application program to the display screen.

The wireless transmitter of the remote control device transmits the absolute coordinate signal to the electronic device. The wireless receiver receives the absolute coordinate signal. Thus, the absolute coordinate signal received by the wireless receiver is transmitted to the controller. The controller outputs an image of the application program with touch control function to the display screen, and a plurality of areas in the image correspond to a plurality of commands.

After the controller receives the absolute coordinate signal generated by the motion at the input element, the absolute coordinate signal is displayed at the display screen via the cursor. The touch position at the input element maps to the position of the cursor at the display screen, and the absolute coordinate signal is not operated on the application program. The remote control device transmits the touch position as the absolute coordinate signal, and the aspect ratio of the input element and the display screen is the same. Thus, when the user touches the upper left corner of the input element, the cursor is displayed at the upper left corner of the display screen. The cursor moves at the display screen corresponding to the touch position at the input element, but it is not operated on the application program. That means, even though the user clicks an area of the image, the command corresponding to the area cannot be executed.

The motion signal is received by the remote control device, the remote control device transmits the motion signal to the electronic device, and the controller executes the application program according to the absolute coordinate signal from the input element. A predetermined motion at the input element is received to generate the motion signal, and the predetermined motion is a double-clicking motion at the input element. A button of the remote control device can also be pressed to generate the motion signal, and the button is electrically connected to the control unit. When the button is pressed down, the motion signal is transmitted. The motion signal may also be generated by determining whether the pressure or a touch area at the input element exceeds a threshold, which is not limited herein.

Although the display screen does not have a touch control function, it can be used as a touch control screen via the input element of the remote control device. The touch position at the input element determines the position of the cursor at the display screen. When the motion signal is transmitted, the controller executes the application program and executes the predetermined command corresponding to an area in the image, which can achieve an effect of clicking at the image of a touch control screen to execute commands. That means, the remote control system can execute the application program supporting touch control at the electronic device via the remote control device.

In sum, the remote control system and the remote control method thereof enables the electronic device without a touch control screen to execute the application program supporting touch control without modification. Moreover, the input element of the remote control device is used to operate a cursor in the image of the electronic device. Thus, the application programs which can be applied to the electronic device are increased, and the user can execute the application programs of the mobile phone or the computer at the TV to get a better visual and audio effect.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A remote control system, comprising:
   a remote control device including an input element, a control unit and a wireless transmitter, wherein the control unit is electrically connected to the input element and the wireless transmitter, an object is adapted to touch the input element so as to generate an absolute coordinate signal according to an absolute position of the object on the input element, and the wireless transmitter transmits the absolute coordinate signal and a motion signal; and
   an electronic device including a wireless receiver and a display screen, wherein the wireless receiver receives the absolute coordinate signal and the motion signal, and the wireless receiver displays the absolute coordinate signal at the display screen via a cursor,
   wherein when the electronic device does not receive the motion signal, the absolute coordinate signal is not operated on an application program of the electronic device, and when the electronic device receives the motion signal, the absolute coordinate signal is operated on the application program.

2. The remote control system according to claim 1, wherein the electronic device includes a controller electrically connected between the wireless receiver and the display screen and outputting an image of the application program to the display screen.

3. The remote control system according to claim 1, wherein the remote control device is a mobile phone or a computer.

4. The remote control system according to claim 1, wherein the remote control device further includes a button electrically connected to the control unit to transmit the motion signal to the electronic device.

5. The remote control system according to claim 4, wherein the remote control device further includes a fixing part to fix the button to continuously transmit the motion signal to the electronic device.

6. A remote control method of a remote control system applied to a remote control device and an electronic device, comprising following steps:
- receiving a motion at the remote control device and generating an absolute coordinate signal, wherein an object is adapted to touch the input element so as to generate the absolute coordinate signal according to an absolute position of the object on the input element;
- transmitting the absolute coordinate signal to the electronic device;
- displaying the absolute coordinate signal at the electronic device via a cursor, wherein the absolute coordinate signal is not operated on an application program of the electronic device; and
- receiving a motion signal at the remote control device, wherein the remote control device transmits the motion signal to the electronic device to make the absolute coordinate signal is operated on the application program.

7. The remote control method according to claim 6, wherein the remote control device is a mobile phone or a computer.

8. The remote control method according to claim 6, wherein the motion signal is generated when a predetermined motion is received at an input element of the remote control device.

9. The remote control method according to claim 8, wherein the predetermined motion is a double-clicking motion on the input element.

10. The remote control method according to claim 8, wherein the predetermined motion is generated when a pressure or a contacting area on the input element is larger than a threshold.

* * * * *